US011184256B2

(12) United States Patent
Dale et al.

(10) Patent No.: US 11,184,256 B2
(45) Date of Patent: Nov. 23, 2021

(54) METHOD AND DEVICE FOR FILTERING PACKETS

(71) Applicant: THE SECRETARY OF STATE FOR FOREIGN AND COMMONWEALTH AFFAIRS, Cheltenham (GB)

(72) Inventors: Robert John Dale, Cheltenham (GB); John Alan Thorp, Cheltenham (GB)

(73) Assignee: The Secretary of State for Foreign and Commonwealth Affairs, Cheltenham (GB)

( * ) Notice: Subject to any disclaimer, the term of this patent is extended or adjusted under 35 U.S.C. 154(b) by 18 days.

(21) Appl. No.: 16/349,352

(22) PCT Filed: Oct. 18, 2017

(86) PCT No.: PCT/GB2017/000154
§ 371 (c)(1),
(2) Date: May 13, 2019

(87) PCT Pub. No.: WO2018/091857
PCT Pub. Date: May 24, 2018

(65) Prior Publication Data
US 2019/0349271 A1    Nov. 14, 2019

(30) Foreign Application Priority Data

Nov. 21, 2016  (GB) ..................... 1619619

(51) Int. Cl.
*H04L 12/26*    (2006.01)
*H04L 29/06*    (2006.01)
*H04L 29/08*    (2006.01)

(52) U.S. Cl.
CPC ............ *H04L 43/028* (2013.01); *H04L 69/22* (2013.01); *H04L 69/324* (2013.01)

(58) Field of Classification Search
None
See application file for complete search history.

(56) References Cited

U.S. PATENT DOCUMENTS 5,414,650 A *  5/1995  Hekhuis ................. H03M 7/30
                                                       341/51
6,335,935 B2 *  1/2002  Kadambi ............ H04L 12/4641
                                                      370/396

(Continued)

FOREIGN PATENT DOCUMENTS

CN       101599966 A     12/2009
JP       2009049940 A     3/2009
(Continued)

OTHER PUBLICATIONS

United Kingdom Patent Application No. GB1619619.8, Search Report dated Apr. 3, 2017, 3 pages.
(Continued)

*Primary Examiner* — Brian S Roberts
(74) *Attorney, Agent, or Firm* — Kilpatrick Townsend & Stockton LLP; Dean W. Russell

(57) ABSTRACT

In the field of data filtering the invention discloses a method of filtering data and a data filter (1), both with optional features, which assess network data using a number of criteria to refine it to a format appropriate for a user.

24 Claims, 4 Drawing Sheets

(56) References Cited

U.S. PATENT DOCUMENTS

| | | | |
|---|---|---|---|
| 6,480,489 B1* | 11/2002 | Muller | H04L 49/90 370/389 |
| 8,769,665 B2* | 7/2014 | Chan | H04L 65/1059 726/13 |
| 9,916,269 B1* | 3/2018 | Machulsky | G06F 13/4068 |
| 2002/0196796 A1 | 12/2002 | Ambe et al. | |
| 2003/0185220 A1* | 10/2003 | Valenci | H04L 12/413 370/398 |
| 2005/0033990 A1 | 2/2005 | Harvey et al. | |
| 2005/0238022 A1* | 10/2005 | Panigrahy | H04L 63/0254 370/392 |
| 2010/0135302 A1 | 6/2010 | Ra et al. | |
| 2011/0292934 A1 | 12/2011 | Oishi | |
| 2014/0304802 A1 | 10/2014 | Pope et al. | |
| 2015/0071283 A1 | 3/2015 | Hammond et al. | |

FOREIGN PATENT DOCUMENTS

| | | |
|---|---|---|
| WO | 2015185461 A1 | 12/2015 |
| WO | 2018026557 A1 | 2/2018 |

OTHER PUBLICATIONS

International Patent Application No. PCT/GB2017/000154, International Search Report and Written Opinion dated Dec. 22, 2017, 14 pages.
United Kingdom Patent Application No. GB1717035.8, Combined Search and Examination Report dated Mar. 21, 2018, 6 pages.
United Kingdom Patent Application No. GB1717035.8, Examination Report dated Apr. 12, 2019, 3 pages.
European Patent Application No. 17790803.5, Office Action dated Mar. 31, 2020, 7 pages.

* cited by examiner

METHOD AND DEVICE FOR FILTERING PACKETS

The invention is in the field of filtering packets of data, in particular for the purpose of assuring that their content meets one or more pre-defined requirements.

In large-scale applications, such as use on networks, data may be arranged in a packet format, typically comprising a header which comprises information to help recipients of the packet to understand what it is, where it is from and the like, and then a payload, comprising the bulk of a message or the data a user would like to send and/or receive. Volumes of data on networks, and thus the number of packets, has tended to increase in recent times, which presents users of such data who may, for example, be those who wish to perform processes on it, store or analyse it, and/or network managers, with the difficulty of accommodating new and/or varied file formats and rich file types, which can consume resource to manage, for example by parsing and/or directing such "packetised" data between nodes efficiently. It is thus desirable to ensure that any packet present is in a format (taken as being one or more file types and/or data types and/or content, in respect of the header, payload or both) acceptable to them.

In a first aspect of the invention there is thus provided a method of filtering packets comprising the following steps;
Providing a first processing means and a second processing means with a unidirectional pathway there-between;
Separating one or more elements of the header of each packet into metadata associated with the packet using the first processing means,
forwarding the metadata along the unidirectional pathway to the second processing means and in the second processing means subsequently using that metadata to;
Identify packets comprising any format other than one or more specified EtherTypes and decide how to handle them;
Identify packets comprising Etherframe broadcast data and decide how to handle them;
Identify packets comprising VLAN tagging information and decide how to handle them;
Identify packets comprising broadcast and/or multicast and/or reserved destination IP addresses and decide how to handle them;
before permitting the resulting data to continue.

This method provides the user with a simple way of ensuring the resulting data available to them is in a format acceptable to them. In respect of use of the resulting data by hardware of any kind, ensuring it is known to be in a format acceptable to the user may permit processes and/or hardware types to be consistent, resulting in potential discounts for volume purchase, and/or a lower support requirement than having to provide processes or hardware capable of catering for any format exceeding the known set the invention will yield. The skilled reader will appreciate that filtering may take place at any relevant layer of any given computer system model, for example in respect of the Open Systems Interconnection (OSI) model, filtering may take place at any of layers 2, 3 and/or 4 if so required to identify the required elements.

The skilled reader will also appreciate that once one or more elements of the header have been separated in to metadata the subsequent method steps (prior to the decision step) can be performed in any order and are not dependent on one another. Indeed if resources permit, they may be performed substantially concurrently. Separating elements of the header of each packet into metadata associated with the packet may comprise simple copying of the elements in to additional metadata leaving the original header intact, or copying whilst also deleting the original header elements (indeed they may choose to delete the whole header), depending on the user's requirements. Should some or all of the header be deleted, the packet would of course be rendered inoperable by conventional hardware should it pass to it, as the missing header elements would mean it could not be parsed correctly. If the user does not wish to delete some or all of the header, they could modify the header (or elements thereof) by overwriting the original data with something of their choosing to ensure it cannot be parsed correctly and thus does not pose a threat. Having at least a copy of the relevant element in metadata means the user can work using that, rather than on the original header, reducing the risk that the original packet will inadvertently be parsed and/or transmitted.

Any further work such as format transforms etc as is set out below, will be performed on the payload, with recourse to the header (or elements thereof) in metadata or in the original header as may be required for the relevant operation.

Deciding how to handle each of the respective identified file types or data types means the user will determine what they wish to do, which may be driven, at least in part, by the intended use or destination of the resulting data. Such decisions will include, but may not be limited to, dropping or discarding some or all of the resulting data, by not permitting it to continue using any convenient means, or transforming the resulting data in to another format or type, for example if the data purports to comprise one data type, it may be known that it is possible to transform such data into other specified types, or by providing a wrapper around them of a known or another data type, or indeed in some cases if the intended use or destination can tolerate it, the resulting data may be permitted to continue substantially without modification. For the avoidance of doubt, that means that if a packet passes all of the relevant filters, the resulting data may comprise the original data, because the user has decided that handling it conventionally and/or without modification is acceptable to them.

"Unidirectional" means only permitting passage of data in one direction e.g. from the first processing means to the second processing means. This ensures that any data from the second processing means is not passed back to the first processing means. This provides isolation of secure services on the second processing means from the network services on the first processing means, whilst allowing for information to be transferred between the first processing means and the second processing means. "Continue" means forwarding the data to a region external to the second processing means e.g. the third (or further) processing means. If the data is not permitted to continue is may be disposed of or altered as desired by the user.

Optionally there is provided a method of filtering packets further comprising the step of
Verifying a packet against one or more pre-determined standards and deciding how to handle them.

"The packet" here means either the header (which may state what file type the packet claims to be), the payload, or both, as the user may require. This optional method step provides an additional level of assurance in that it permits data to be verified against formats that can be expressed and assessed, for example in either an algorithm or state machine form, so for example the user may choose to verify all data against one or more data serialisation languages such as YAML Ain't Markup Language (YAML) or bitmap (BMP) file types. The user can then decide how to handle the results of the verification process, which again may be driven by the intended use or destination of the resulting data. If the resulting data does conform to the relevant standard, the user may choose to permit it to continue substantially without modification in the same vein as above.

Alternatively, the user may choose to transform the header and/or payload in to a different standard, for example by file conversion or by providing a wrapper around, or otherwise wrapping one or both of them with the same or another file type, or they may drop or discard some or all of it.

Optionally there is provided a method of filtering packets further comprising the step of:

Constructing a frame header for use in creating a packet comprising the data.

The user may have rendered the original packet inoperable by deleting one or more elements of the header when copying them to metadata. If so, they may even choose to delete the complete header to ensure there is no prospect the original packet can transit on or around conventional hardware. Even if this is the case, it is not necessary to, in effect, reconstruct a packet, as relevant header information is available in the associated metadata, and any network or onward recipient can be configured to handle data where the header and payload are separated. However, there may be occasions when it is desirable to form the data in to a conventional packet format, to permit use in processes expecting this, and/or by packet switched hardware, nodes or networks. Using this method step the user may construct a frame header (or required elements thereof) and, depending on the status of the original header, use this new construct to overwrite it in whole or in part, or append it to the original payload to form a conventional packet before it is permitted to continue. The frame header may be formed, or informed, by or from the original header, the metadata, or indeed may be completely new with no content related to the original header or its elements.

The invention can also be thought of as a method of filtering packets for use with a first processing means and a second processing means connected via at least one unidirectional data pathway positioned there-between comprising the following steps;

Separating one or more elements of the header of each packet into metadata associated with the packet using the first processing means, forwarding the metadata along the unidirectional pathway to the second processing means and subsequently using that metadata to;

Identify packets comprising any format other than one or more specified EtherTypes and decide how to handle them;

Identify packets comprising Etherframe broadcast data and decide how to handle them;

Identify packets comprising VLAN tagging information and decide how to handle them;

Identify packets comprising broadcast and/or multicast and/or reserved destination IP addresses and decide how to handle them;

before permitting the resulting data to continue.

In a further aspect of the invention there is provided a data filter configured to implement the methods outlined herein comprising a first processing means, a second processing means and a unidirectional pathway provided between the first processing means and second processing means.

The unidirectional pathway may comprise a hardware element, for example at least one SerDes Pin.

One or more SerDes Pins may be configured to provide connections between processing means.

SerDes pins can only ever function in one direction, input or output, as designated by the underlying silicon. The direction of such: pins is not defined by any processing means configuration image, thus their use provides assurance of one way data transfer, with it being possible to connect only the forward path physically to, or on, a PCB or substrate, which can be visually inspected.

The objective of the unidirectional pathway is to prevent the passage of data between the second processing means and the first processing means so as to ensure isolation of the data contained in the second processing means from the first processing means. As a result, the data stored on the second processing means cannot be pulled to the first processing means by an unauthorised individual. Using a combination of the at least one SerDes pin and a unidirectional amplifier for the unidirectional hardware means ensures that more than one failure must occur for the device to be compromised. Therefore, once again this provides an extra layer of assurance that the device is working securely and that there is no leakage of unwanted data between the second processing means and the first processing means. The high reverse isolation property of the amplifier ensures that any variation in the output is not mirrored in the input i.e. it improves the isolation characteristic between the most trusted interface and the other interface.

The unidirectional amplifier comprises a unity gain amplifier having high reverse isolation characteristics which ensures one way data travel is provided should any of the termination sensing circuit associated with the SerDes be used as a return path.

In a preferred arrangement there is provided a first and second SerDes pin with the unidirectional amplifier position there-between. Therefore, the unidirectional amplifier is positioned in series with the first SerDes pin. Similarly the unidirectional amplifier is positioned in series with the second SerDes pin.

Further, the data filter may comprise a transceiving means for a network connection.

A specific data filter for implementing the method is useful for the user as they can include such devices prior to permitting data to be used, for example, in a specific process, on their network, or on or by a specific node.

Optionally there is provided a data filter wherein the transceiving means comprises at least one receiving means and at least one other transmitting means.

This is useful for a user for fault finding and testing, as separating out receiving and transmitting means permits each unit to be individually tested if necessary.

Optionally there is provided a data filter wherein the transceiving means comprises an Ethernet interface. Such interfaces, including but not limited to the known 8P8C (commonly referred to as the RJ45 connection), are convenient for the user as it is a common and robust interface type.

Optionally there is provided a data filter wherein the processing means comprises at least one of an FPGA, an ASIC, or an integrated circuit. Field Programmable Gate Arrays (FPGA's) are readily available and cheap, thus are suited to examples of how the invention may be put into effect. It is also possible to implement the data filter using substantially equivalent hardware, such as an Application Specific Integrated Circuit (ASIC), or a dedicated circuit, as the user may require.

Optionally there is provided a data filter wherein the processing means comprises at least two of FPGAs, ASICs or integrated circuits.

In addition to the above noted advantages, separation of functions between two FPGAs, ASICs or integrated circuits (or any combination thereof) permits a further degree of assurance by the user, by for example, separating secure functions from non-secure ones.

Optionally there is provided a data filter wherein the processing means comprises at least three of FPGAs, ASICs or integrated circuits.

At least three of FPGAs, ASICs or integrated circuits permits a further separation of functions beyond two of such devices, which is further explained in the non-limiting example embodiments below, providing an additional degree of assurance by permitting a further delineation of function per FPGA, ASIC, integrated circuit, or any combination thereof.

Optionally there is provided a data filter wherein one processing means substantially manages network services, or where one processing means substantially manages secure services.

This permits respective processing means to be configured to manage one or more dedicated tasks, making more efficient use of resources.

Optionally there is provided a data filter wherein each processing means is implemented as a "stripe" on a single PCB.

From a manufacturing perspective this ensures a physical separation between the processing means, such that if they are dedicated to one or more particular tasks, the layup or layout of components on a printed circuit board (PCB) or substrate can be easily managed, and from an assurance perspective, connections between each processing means can be physically verified. Connectivity between one or more stripes may be used to enforce a one-way data flow through the device.

Optionally there is provided a data filter comprising test and/or debug features.

Such features may include one or more of a JTAG controller, asynchronous serial port(s) or debug indicators such as LEDs. Each of these individually may permit a user to debug and program or configure the data filter using known standards and connections, for example JTAG can be used for connection testing and/or In System Programming, if the user so requires.

Optionally there is provided a data filter comprising bitstream encryption.

As data presented to or generated by the invention may not comprise more than a raw, unencoded bitstream, encrypting it adds a layer of commercial grade protection and assurance to hinder or prevent copying and/or reverse engineering of hardware designs, and/or to guard against malicious interception or disruption.

Optionally there is provided a data filter comprising SEU mitigation. Single event upset (SEU) mitigation may be deployed at the chip or system level to overwrite, rewrite or modify data to correct soft errors if, for example, it is wrong or has been corrupted, saving the user time in that they may avoid the need to perform a system reboot to correct such an error.

Optionally there is provided a data filter comprising indicating means to indicate the status of the data filter.

Convenient for the user is an indication of the function of the filter at any one time, for example to show power, data receipt or transmission, traffic, packet-in-transit or the like, or error codes.

Optionally there is provided a data filter comprising at least one power supply unit.

This permits a data filter to be self-contained, ensuring that from an assurance perspective there is no third party tampering or additional features added when the data filter is powered.

To fully ensure the processors are self-contained, the first processing means may have a first power supply unit and the second processing means may have a second power supply unit, wherein the first power supply unit and the second power supply unit are separate and distinct from each-other.

Optionally there is provided a data filter wherein the at least one power supply unit is powered by Power over Ethernet. Both the first processor unit and the second processor unit may be powered by Power over the Ethernet. Power over Ethernet is a convenient source for the user not requiring external connections or power draw.

Optionally there is provided a data filter wherein Power over Ethernet input is sourced from a trusted network port.

This permits the user to ensure the power connection from a Power over Ethernet source is known, to minimise the risk of side-channel communications. Optionally there is provided a data filter which is configurable by a user.

This permits the user to determine, among other things, the method steps which will be implemented, and to set rules to be applied, for example, when deciding how to handle relevant packets, the user may set their choice as a default or by exception.

In an alternative embodiment of the invention, there is provided a data filter comprising transceiving means for a network connection and a processing means, the filter being configured to implement a method of filtering packets comprising the following steps;

Separating one or more elements of the header of each packet into metadata associated with the packet and using that metadata to;

Identify packets comprising any format other than one or more specified EtherTypes and decide how to handle them;

Identify packets comprising Etherframe broadcast data and decide how to handle them;

Identify packets comprising VLAN tagging information and decide how to handle them;

Identify packets comprising broadcast and/or multicast and/or reserved destination IP addresses and decide how to handle them;

before permitting the resulting data to continue.

The data filter may comprise bitstream encryption. Additionally or alternatively, the data filter may comprise SEU mitigation.

The data filter may comprise at least one receiving means and at least one other transmitting means.

The transceiving means may comprise an Ethernet interface.

The processing means may comprise at least one FPGA, An ASIC or integrated circuits.

The data filter may comprise at least one unidirectional hardware means, for example at least one SerDes pin.

Further there may be provided at least one unidirectional amplifier used in combination with the SerDes pin to form the unidirectional hardware means. The use of the at least one SerDes Pin and the unidirectional amplifier (for example a high gain amplifier) ensures that more than one failure must occur for the device to be compromised.

At least one processing means may substantially manage network services.

At least one processing means may substantially manage secure services.

The data filter may comprise a power supply unit.

The power supply unit may comprise a power supply.

The power supply may be powered over the Ethernet. The Power over the Ethernet input may be sourced from a trusted network port.

The present invention will now be described, by way of example only, in which.

In the figures like elements are denoted by like reference numerals.

Figure 1:
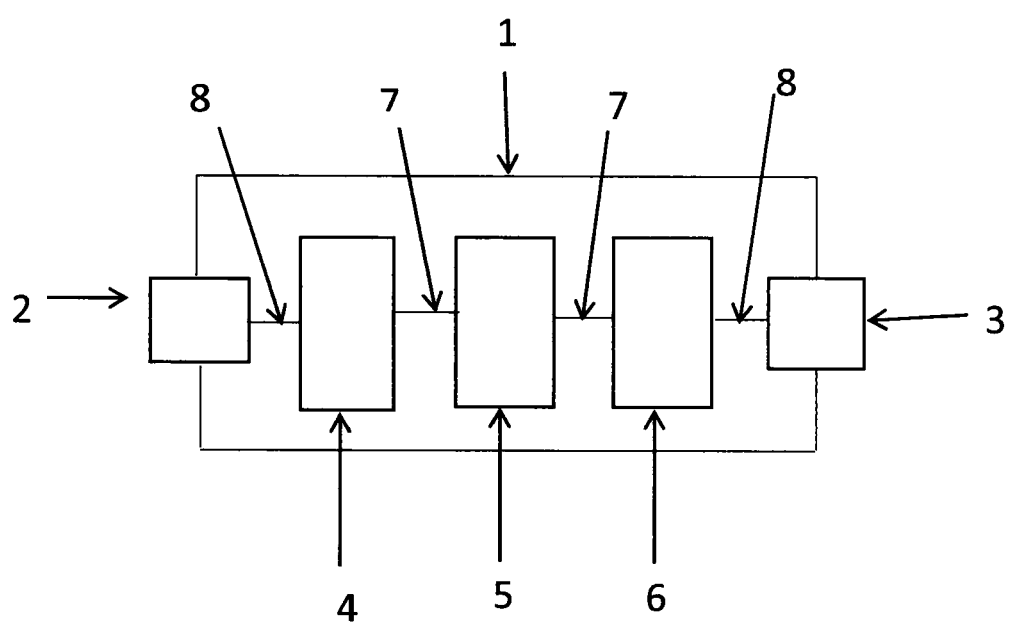
FIG. 1 shows an example high-level architecture of a device implementing the method comprising three processing means.

The skilled reader will appreciate how complex the implementation of the method is, and thus the number of the optional features present, will be driven by the user's requirements. Those requirements may include the level of assurance the user requires; a user requiring maximum assurance will likely be minded to incorporate every optional feature, however one who has less of a requirement may scale back.

Common to all embodiments of the invention a user, who may for example be a network manager, wishes to ensure that data arranged into packets in processes they employ and/or on their network or is otherwise presented to nodes or other equipment, has been checked and/or refined, in order to ensure that they are comfortable with its format (and thus its file types and/or data types and/or content), permitting them to optimise processes and/or hardware to deal with it. This is because data volumes, data types and content continue to increase in complexity, requiring processes and/or hardware to deal with new challenges (such as rich data types) which such processes and/or hardware may not have originally been optimised for. Thus checking and/or refining a data set to a known format that processes and/or hardware can deal with, provides a user with assurance that processes and/or hardware can cater for data presented to them, ensuring service levels can be assured or maintained, or problems avoided.

Common to all embodiments of the invention in any and/or all method steps a decision as to how to handle identified packets may comprise dropping or discarding them, which may be achieved through any convenient method, for example by not asserting 'start-of-packet' or 'data-valid' on egress. Alternatively, the decision may be to perform one or more format transforms on such packets, testing to ensure that the packet comprises one or more particular file type or data types, as it can be known that transforming one file type or data type to another is effective. Alternatively, the resulting decision may be that once identified as a particular file type or data type, data can continue substantially without modification, because the use, destination or intended-destination of the data, can tolerate it.

In all cases the user wishes to filter packets comprising the following steps:

Providing a first processing means and a second processing means with a unidirectional pathway there-between;

Separating one or more elements of the header of each packet into metadata associated with the packet using the first processing means, Forwarding the metadata along the unidirectional pathway to the second processing means and in the second processing means subsequently using that metadata to;

Identify packets comprising any format other than one or more specified EtherTypes and decide how to handle them;

Identify packets comprising Etherframe broadcast data and decide how to handle them;

Identify packets comprising VLAN tagging information and decide how to handle them;

Identify packets comprising broadcast and/or multicast and/or reserved destination IP addresses and decide how to handle them;

before permitting the resulting data to continue.

The skilled reader will appreciate these method steps may accept packets addressed to any MAC address by, for example, not filtering on destination MAC address. The skilled reader will also appreciate that such a method is not concerned by the status of an Ethernet frame, ie where conventional network hardware may drop Ethernet frames with an invalid frame check sequence (FCS), the invention will tolerate such a position, or indeed the user may choose to separate out Ethernet frames in to those which have a valid FCS, and those which do not or are otherwise malformed, and treat them separately. Elements of the OSI model layer 2 and/or layer 3 and/or layer 4 (or equivalent if a different model is used) header of each packet are separated out in to metadata associated with the packet. This includes for example MAC address, IP address and sequence numbers at the respective layers of the OSI model, which can be individually or collectively separated out. In this context "associated with" means linked to the data; the user simply needs to know which metadata is related to what data, the metadata does not need to be stored or transmitted with it or alongside the data, indeed it may be directed or stored elsewhere. These elements may comprise MAC addresses and EtherType, which may be separated out using a layer 2 and/or layer 3 and/or layer 4 header parser which generates a layer 3 packet with these elements as the payload, as metadata associated with the relevant internet protocol (IP) packet. The identification steps will initially be performed on the metadata and not the original header. In all embodiments set out herein the original header is deleted, however the skilled person will appreciate this is not necessary, it may be that the user chooses to delete or modify the elements copied to metadata, or indeed to retain the original header and simply perform work on metadata. The destination MAC address will be used to decide if the original Ethernet frame was a broadcast frame, and EtherType is used to verify the packet is a valid IP version, the method steps for which can be deployed before or after this one. Metadata may be transmitted as a fixed-sized block, which may thus include some unused bits at the end, and although that risks reducing link efficiency, it reinforces what amounts to a protocol break.

Identifying packets comprising one or more specified EtherTypes will identify, for example those at layer 2 EtherType=0x0800, and the layer 3 "IP Version" field being set to 0x4 (both in this example of course as IP Version 4). Naturally if EtherType data has been moved to metadata prior to this method step being deployed, this step will need to check there. The skilled reader will appreciate this step could include other EtherTypes with appropriate checks performed, IP Version 4 is simply used as an example and should not be seen as limiting the invention. For example if the EtherType=0x0806 it is an Address Resolution Protocol, which may or may not be acceptable to the user, as well as other values accepted by the IEEE Registration Authority in their list of EtherType values.

Packets comprising Etherframe broadcast data may be identified using known broadcast address, FFFF.FFFF.FFFF. Naturally if it has been moved there in advance of this method step being deployed, such a method step will need to assess metadata, as the address will be stored there.

Packets comprising VLAN (Virtual LAN) tagging information are identified using their TPID (tag protocol identifier) field, which appears as an EtherType value set to 0x8100, which therefore identifies 802.1Q TPID of 0x8100. Doubletagged VLAN frames can be identified using EtherType=0x9100 which identifies the outer tag, with the user then determining if they also wish to identify and check the 0x8100 inner tag.

Packets comprising or associated with a broadcast and/or multicast and/or reserved destination IP addresses are identified using a layer 2 filter which searches for IP destination addresses 224.0.0.0 to 255.255.255.255, Class D being multicast and Class E being reserved, and a layer 3 filter in which Class D multicast addresses are those with the most significant nibble of the most significant byte equal to b"1110" mapping to the address range 224.0.0.0 to 239.255.255.255. Class E reserved addresses are those with the most significant nibble of the most significant byte equal to b"1111" mapping to the address range 224.0.0.0 to 255.255.255.255. Naturally where these addresses are held depends on which method steps have been deployed (either the original frame or metadata if layer 2 header elements have been separated out), which will dictate where this method step will check.

These method steps each give the user advantages, and together ensure that user is assured the resulting data is in a format they are content to manage, and that for example, data which may be malicious (such as a source MAC address) is not passed through as a conventional frame.

The optional step of verifying a packet against one or more predetermined standards and decide how to handle the results may be implemented. The skilled person will appreciate packet here means in the main the payload, with recourse to any header elements (in the header, metadata or both) as may be required. In this example both YAML and BMP formats are tested, which provides a result indicating if the respective format is strictly adhered to or not. The skilled reader will appreciate other formats would be suited to such a verification process using either state machines or algorithms, and YAML and BMP are simply used as examples and should not be seen as limiting the invention.

The optional step of constructing a frame header for use in creating a packet comprising the data may be implemented. The skilled reader will appreciate this step is not necessary, the destination MAC address will be available at least as metadata associated with the packet, thus can be obtained from it. The advantage of rebuilding the packet in a conventional form, rather than having data separated out in to metadata too, is that conventional packet switching can then be used with the resulting data regardless of any changes the user has decided to make to the original header. How the header is reconstructed depends on the user's requirements and the status of the original header. In some cases they may be content to use the original layer 2 header information, should the payload have been, in effect, cleansed or altered if one or more identified packets has been handled by, for example, being transformed.

Alternatively the header may be informed by the metadata, or indeed may be completely new, with no content related or relating to the original header information. If the packet has been dropped or discarded there is nothing to do, unless the user wishes to point out that there was a packet, and to create a header with a fully or partially empty payload, so that for example, recipients are aware they are missing data and that packets have been dropped or discarded. This can be achieved because the metadata is separated and is associated with a packet. Thus if there is no longer a packet (because for example as above, if not set to 'data-valid'), a phantom or dummy packet can be formed as the data, with the newly constructed frame header appropriately appended.

In a first example embodiment the skilled reader will appreciate it may be useful for the user to have available a data filter 1 configured to implement a method according to the steps outlined in the first embodiment above (with or without its variant steps).

Turning first to FIG. 1 such a data filter 1 may comprise transceiving means for a network connection comprises at least one receiving means 2 and at least one other transmitting means 3 although the skilled reader will appreciate there may be more than one receiving means 2 should the user wish to receive data from more than one source, and more than one transmitting means 3 should the user wish to transmit data to more than one destination. Likewise the reader will also appreciate the receiving means 2 and transmitting means 3 could comprise one unit. In this first embodiment the receiving means 2 and the transmitting means 3 both comprise an Ethernet interface, in this first embodiment these comprise the common and robust 8P8C (RJ45) connections. In the data filter 1 one or more of these may be designed in to a PCB.

Also present in this same first embodiment are three processing means, a first processing means 4, a second processing means 5, and a third processing means 6, which in this example all comprise FPGAs but may equally comprise ASICs or integrated circuits, or any combination thereof (for example one FPGA, one ASIC and one integrated circuit, as the user may deem appropriate for their needs). The skilled reader will appreciate that only one processing means is necessary, as it can perform all method steps if so configured.

In this first embodiment data is received by the receiving means 2 and travels notionally from left to right through the data filter 1 to the transmitting means 3. An interconnection 8 between the receiving means 2 and the first processing means 4, as well as an interconnection 8 between the third processing means 6 and the transmitting means 3 comprise bi-directional data flow to support standard layer 2 and layer 3 signalling.

As this first embodiment comprises three processing means different method steps are performed by each of them to separate out their functions, to provide the user with added assurance. In this embodiment the first processing means 4:

separates elements of the layer 2 and/or layer 3 and/or layer 4 header of each packet into metadata associated with the packet, in essence managing the network service of data ingress. The connection between the first processing means 4 and the second processing means 5 in this case comprises a SerDes pin 7. SerDes pins are inherently unidirectional, only functioning in one direction as input or output thanks to the underlying silicon. The direction of a SerDes pin 7 is not defined by the configuration image of any of the first processing means 4, second processing means 5, and third processing means 6, and cannot be influenced by firmware design errors or SEU. Thus their presence provides assurance of one-way data transfer electrically. Optionally of course, more than one SerDes pin 7 may be added between the first processing means 4, second processing means 5, and third processing means 6, to support higher bandwidth transfers or data redundancy.

In this first embodiment the second processing means 5:
Identifies packets comprising any format other than one or more specified EtherTypes and decides how to handle them;
Identifies packets comprising Etherframe broadcast data and decides how to handle them;
Identifies packets comprising VLAN tagging information and decides how to handle them;
Identifies packets comprising broadcast and/or multicast and/or reserved destination IP addresses and decides how to handle them;
The skilled reader will appreciate that where it is optional, this embodiment also verifies the data against one or more pre-determined standards and decides how to handle them.

The second processing means 5, which in essence manages secure services is connected to the third processing means 6 with a SerDes pin 7.

In this embodiment the third processing means 6:
Constructs a frame header to create a packet comprising the data,
before permitting data to continue.

Again this separates out functionality as those secure services are performed by the second processing means 5, the third processing means 6 being dedicated to network services, meaning that there is no direct connectivity with the second processing means 5.

In this first embodiment any of the first processing means 4, second processing means 5, and third processing means 6 are implemented as an individual "stripe" on a single PCB.

In a second example embodiment showing a data filter 2 the user has decided to use less hardware as it suits their circumstances. In essence the layup or layout of components is similar to the first example embodiment with a receiving means 2 and transmitting means 3 with similar optional features as above, and are connected using interconnect 8 which is again bi-directional. In this second example embodiment rather than separating out the functions between three processing means, a network services processing means 9 performs the functions of the first processing means 4 and third processing means 6, ie all network services are dealt with by it, so it:
separates elements of the layer 2 and/or layer 3 and/or layer 4 header of each packet into metadata associated with the packet,
Then sends the data using a SerDes pin 7 to the second processing means 5 which as above;
Identifies packets comprising any format other than one or more specified EtherTypes and decides how to handle them;
Identifies packets comprising Etherframe broadcast data and decides how to handle them;
Identifies packets comprising VLAN tagging information and decides how to handle them;
Identifies packets comprising broadcast and/or multicast and/or reserved destination IP addresses and decides how to handle them;
The skilled reader will appreciate that where it is optional, this embodiment also verifies the data against one or more pre-determined standards and decides how to handle them.

Figure 2:
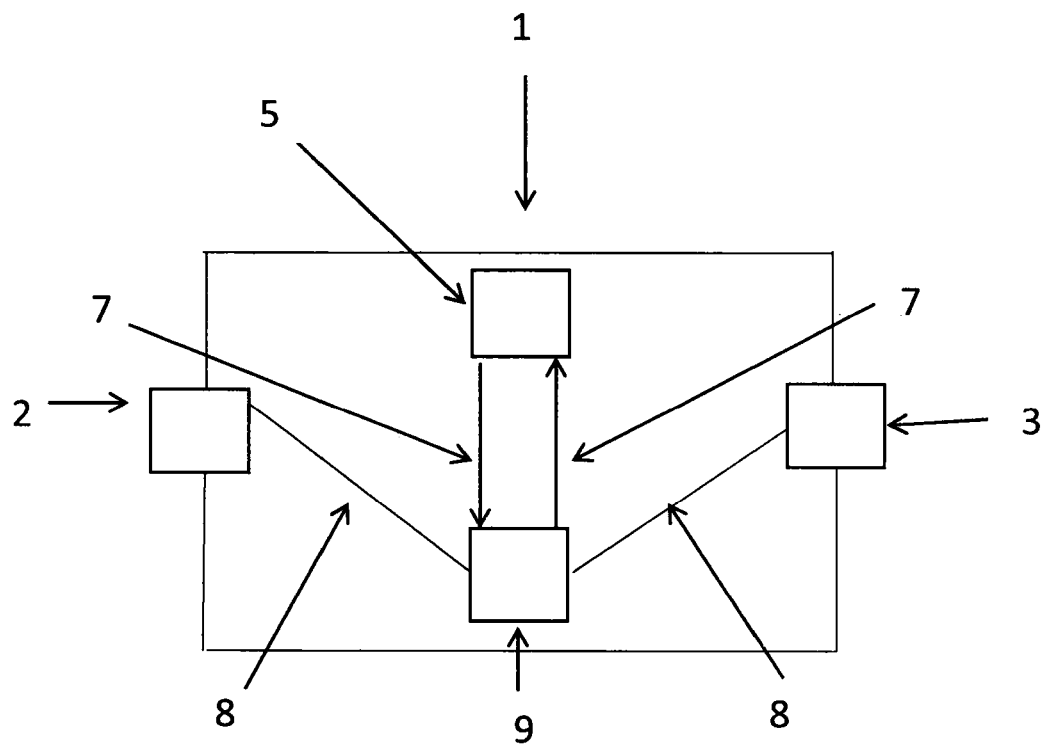
FIG. 2 shows an example high-level architecture of a device implementing the method comprising two processing means.

For the sake of clarity in this example FIG. 2 indicates a direction of data travel, also showing a further SerDes pin 7 also showing an indicative direction of data travel in which the second processing means 5 returns the data to the network services processing means 9 which:
Constructs a frame header for use in creating a packet comprising the data,
before permitting data to continue.

This still gives a separation of function, but by using two, not three processing means, the data filter 1 may be cheaper to manufacture. The skilled reader will appreciate the directional nature of the SerDes pins 7 may be reversed, the arrows are purely used to aid the reader's understanding and should not be taken as limiting the invention. However, as an example, in the case that the second processing means manages secure services, there is a desire to prevent any data relating to the secure services from being transferred to a separate and distinct processing means that deals with, for example network services. Therefore, the implementation of the SerDes pin may be predetermined based on the need of the user i.e. in this case the separation of secure services from network services.

Common to both the first and second example embodiments all of the processing means' (the first processing means 4, second processing means 5, and third processing means 6 in the first example embodiment and the network services processing means 9 and second processing means 5 in the second example embodiment) comprise additional memory which is not shown (in this case SDRAM but equivalent memory types such as RAM, SRAM or static disc for example could be used individually in combination or collectively) to support buffering and the like; all of them comprise test and/or debug features (not shown) comprising a JTAG controller and asynchronous serial ports, although again equivalents would suffice. They all also comprise bitstream encryption (not shown) to protect against copying and reverse engineering of the design, and known SEU mitigation methods (not shown). The skilled reader will appreciate all of these features are optional and are merely presented in these example embodiments to indicate that they can be included. Again common to both example embodiments the data filter 1 comprises indicating means (not shown) to indicate the status of the data filter 1 used in both of the example embodiments power on, data receipt or transmission, packet-in-transit, or error codes, using colour coded lights comprising LEDs.

Figure 3:
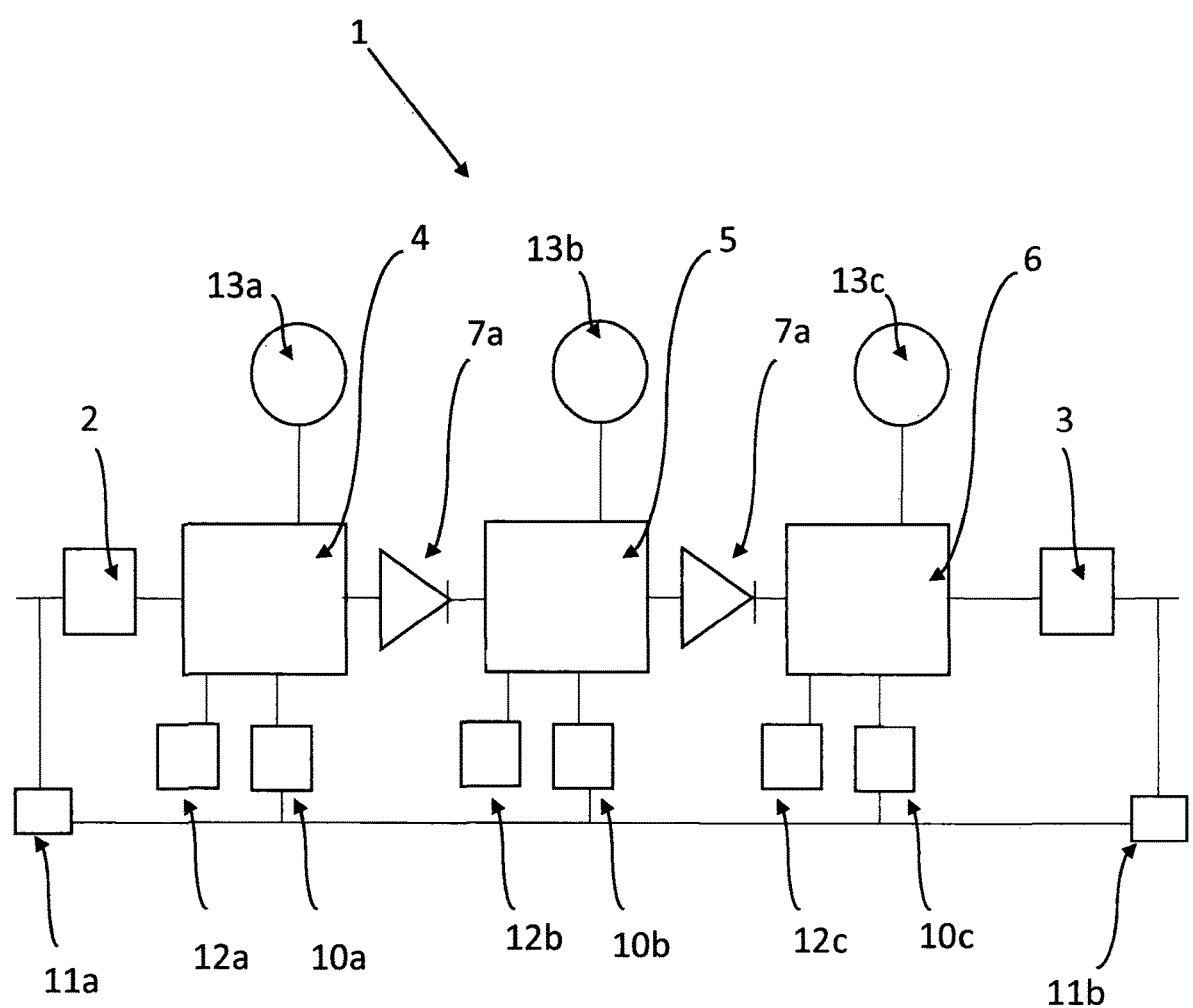
FIG. 3 shows a schematic of the device.

As shown in FIG. 3, common to both the first and second example embodiments the data filter 1 comprises a power supply unit 10*a*, 10*b*, 10*c* powered by Power over Ethernet, where power is sourced from a trusted network port (to minimise the risk of side-channel communications). To ensure isolation of the power source to the processing means the first processing means 4 has a first power supply unit 10*a* and the second processing means 5 has a second power supply unit 10*b*, wherein the first power supply unit 10*a* and the second power supply unit 10*b* are separate and distinct from each other. Both the first and second power supply units 10*a*, 10*b* are powered by Power over the internet via a predetermined port either port 11*a*, or port 11*b*, dependent on which port is considered to be the most trusted port. Therefore, each of the processors take a common high voltage feed, however they have separate local voltage regulators to prevent unintended transmission of information. The separation of each of the processors is further ensured by clearly identifying the individual circuitry on the board (i.e. stripes are separate and distinct).

In most cases where the device is implemented as an output device the power is supplied from the receiver end. In the case that the device is implemented as an input device the power is supplied from the transmitter end. For this reason the device can never be both powered by the receiver end and the transmitter end and the device is set up to ensure that this criteria is met. The most trusted interface is determined at the time of installation and the feed is also selected at that time. In these example embodiments the network port 11a, 11b used to power the system is factory configured to physically accept power from only one port so that if the data filter 1 is incorrectly cabled it will not power up. Therefore, there is no possibility of alternating the feed line once the device has been set up because the most trusted interface and the lesser trusted interface are fixed parameters. It is possible to remotely power cycle the data filter 1 by using Power over Ethernet management features of an external device used to supply power.

The power supply units 10a, 10b, 10c are separate local voltage regulators that are provided for each processor 4, 5, 6 respectively to minimise the chance of unintended transfer of information between the most trusted interface and lesser trusted interfaces. For example, it is known to be able to monitor transformer characteristics as a way of determining information on the operation of a device e.g. by monitoring data transfer associated with the system to provide information on the actual data being transferred across the system. By ensuring that each of the local voltage regulators are independent minimises the ability of a third party accessing such information in this way. The module 11 contains configuration code to load field programmable gate arrays. A processor selection characteristic is implemented to ensure that the correct processor is linked with the correct FPGA, for example, a particular FPGA can only function with a predetermined processor which is identifiable by verifying the position of the processor. Therefore, the processor address is hard wired on the FPGA. This provides further certainty that there has not been any unintentional transfer of information between the most trusted interface with the lesser trusted interface.

A memory storage area 13a, 13b, 13c, for example RAM, is provided to store any meta data or content data to be applied to the filter (and as such acts as a buffer). Similar to the power supply, each processor has its own separate and distinct RAM so as to minimise the leak of data between the lesser trusted interface and the most trusted interface.

Figure 4:
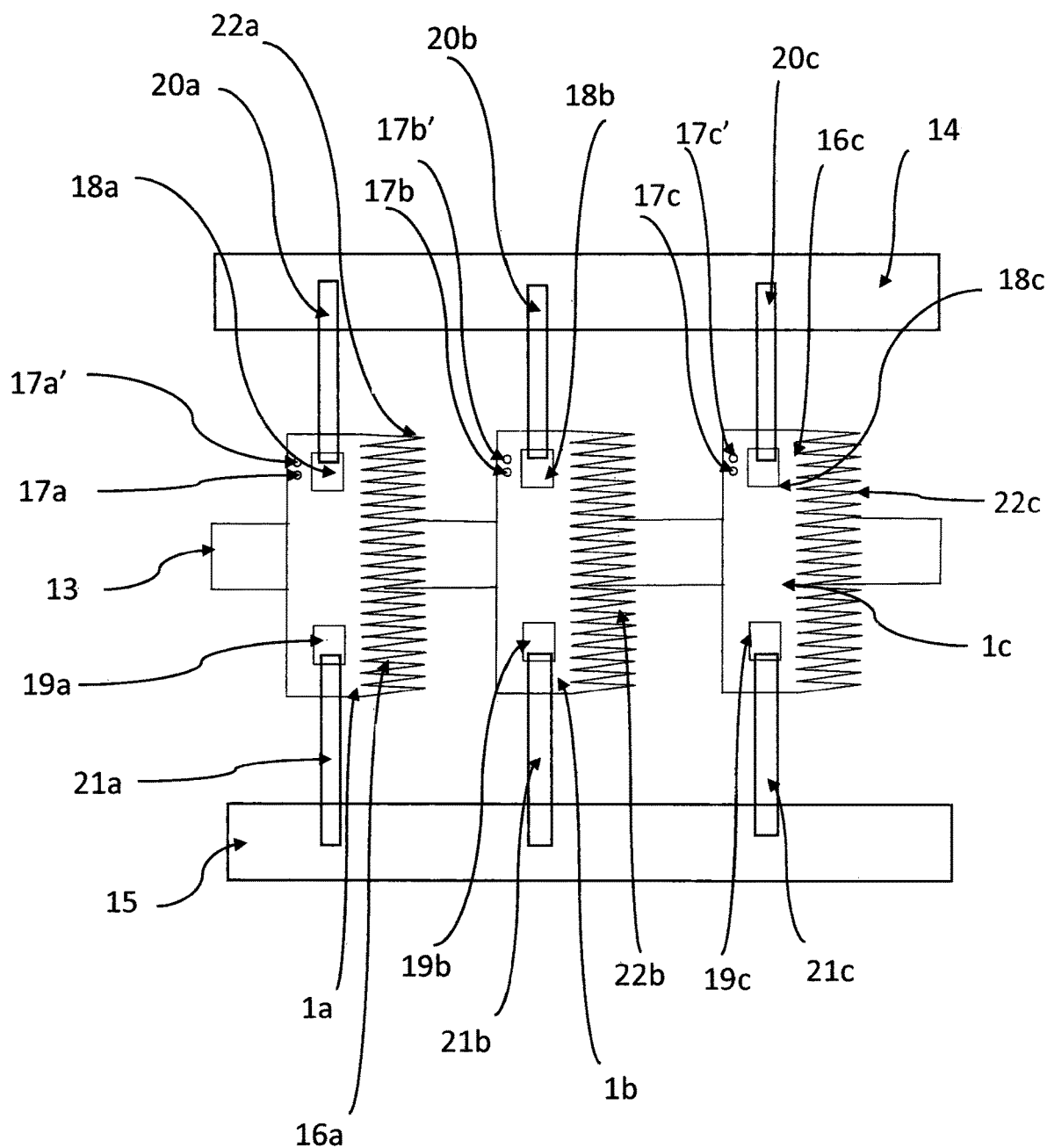
FIG. 4 shows an example of the device attached to a computer rack.

In FIG. 4 there is shown an example set up of three data filters. Each of the three filters are connected to a standard rail 13. The lower trusted interface 14 is separated from the most trusted interface 15. The circuitry of the filter 1 is enclosed in an outer housing 16a, 16b, 16c.

The indicators 17a, 17a', 17b, 17b', 17c, 17c', shown here as de-buffing LED's are used during the initial commissioning and are used to identify instances of successful passage of information and unsuccessful passage of information. The unsuccessful passage of information is distinguished as a fault. When a fault is present the red LED 17a', 17b' and 17'c is activated. In the case of successful transmission of information the green LED 17a, 17b, 17c is activated. The indicator is configured to be of use in the instance that a low data rate is applied. In normal operation the red and green LEDs will be observed as a series of flashes as a real world amount of data packets are applied in realtime. Therefore, in normal operation the flashing is not used to determine the number of successful or unsuccessful packets. Instead the count of packets in and out of the filter will be obtained by standard means and a comparison of these two variables will be used to determine the number of faults in a time period of operation. Therefore, the use of the red and green indicators is mainly of benefit during the commissioning stage of the filter since it removes the requirement for an audit feed. This makes the inclusion of the indicators, i.e. the red and green LEDs useful in the early stage development of the system in which the filter is to be implemented so as to enable the identification of any faults that need to be debugged prior to normal operation of the filter in a way that minimises a point of attack on the system, (in comparison to the scenario where an audit feed was implemented).

The filter can be used to import or export information as desired. This is merely determined by the orientation of the filter. To ensure the correct orientation of the filter, the filter is provided with a single input in the form of a first connector 18a, 18b, 18c, for example a RJ45 connector, and output 19a, 19b, 19c for example a RJ45 connector. The input or first connector 18a, 18b, 18c is adjacent to the receiver end of the housing and the output or second connector 19a, 19,b, 19c is adjacent to the transmitter end of the housing. The data can only be forwarded from the first connector 18a, 18b, 18c to the second connector 191, 19b, 19c. Of course, the data will not be permitted such passage where it does not satisfy the filter criteria to do so. The first connection means cooperates with one end of a first data transfer means, for example a cable such as a CAT 5 or 6 ethernet cable, and the other end of the first data transfer means is connected to a first user interface 14. The second connection means cooperates with one end of a second data transfer means, for example a cable, e.g. a CAT 5 or 6 ethernet cable, and the other end of the second data transfer means is connected to a second user interface 15. This arrangement ensures that there is no overlap between the first data transfer means and the second data transfer means which once again ensures the correct set up of the device and minimises the risk of permitting undesirable information transfer.

The housing 16a, 16b, 16c of the device is clearly marked to indicate the direction of the unidirectional effect. This means that the direction of the flow of data/information through the filter device is clearly marked (not shown) on the external surface of the housing. The provision of only two connectors per data filter device, one being the input and the other being the output also reduces the possibility of incorrectly installing the device.

The mark may be, for example, a print of a circuit diagram of a diode. Alternatively, the mark may be formed in the outer surface of the housing during manufacture or applied subsequently to manufacture of the housing. The mark ensures that the receiver end of the filter and the transmitter end of the filter are clearly identifiable to the user. The desired direction of implementation is dependent on the intended use of the device i.e. as an import or export device.

Common to both the first and second example embodiments the data filter 1 is configurable by a user, in that they may set the rules when decisions need to be made, or indeed determine which method steps are used, as well as determining other configuration such as determining destinations for the data when continuing, replication, backup regimes, etc.

FIG. 4 further shows the channeled side 22a, 22b, 22c of the housing that optimises the cooling of the internal components by increasing the surface area of the housing. Further external cooling means known to the skilled reader may be provided to improve the cooling effect on this channeled side 22a, 22b, 22c.

In the first and second examples of the invention the unidirectional hardware positioned between the first processing means and the second processing means is formed of a first and second SerDes pin with a unidirectional amplifier positioned there between. The first and second SerDes pins are configured in the same orientation. This ensures the passage of the data in one direction only, for example from the first processing means to the second processing means. Similarly, the unidirectional hardware provided between the second processing means and the third processing means is formed of a third SerDes pin and a fourth SerDes pin with a unidirectional amplifier positioned there-between. Therefore the unidirectional amplifier is arranged in series with a SerDes pin.

Beneficially, the first and second examples do not rely on the use of a software stack or CPU and as such there is no requirement for any patches to be implemented or further servicing to be provided. This makes the device entirely stand-alone and capable of ensuring separation between the secure services and the network services as may be required by a user. Further by minimising the lines of code accessible (both in general and specifically accessible from the network services side) this arrangement minimises the possible points of attack (known as the attack surface) making the access to the secure services difficult from the non-secure side of the device. By using a hardware means for the unidirectional link between the most trusted and lesser trusted interfaces it is possible to minimise the software component thereby ensuring that the filter device cannot be tampered with remotely i.e. the only way to tamper with the device is to physically access it so as to modify the firmware or the electronic components. Accessing the device is prohibited when the device is stored in a secure facility.

It is important to note that to enable the device to work the Ethernet is inherently bidirectional and must remain so to operate are required. Therefore, the data transfer means located prior to the first processor and subsequent to the third processor (in the first embodiment only) are also bi-directional.

When considering the re-enforcement of the uni-directional nature of the device by using the extra component, this component need not be an amplifier, but may instead be an alternative unidirectional high speed serial communications component known to a person skilled in the art.

The invention claimed is:

1. A method of filtering packets using a first processor and a second processor with at least one unidirectional pathway there-between, the method comprising the following steps:
   a) Receiving, at the first processor, data packets from an input;
   b) Separating, at the first processor, one or more elements of a header of each packet into metadata associated with the packet;
   c) Forwarding the metadata along the unidirectional pathway to the second processor and using the metadata, at the second processor to:
   d) Identify packets comprising any format other than one or more specified EtherTypes and decide how to handle them;
   e) Identify packets comprising Etherframe broadcast data and decide how to handle them;
   f) Identify packets comprising VLAN tagging information and decide how to handle them;
   g) Identify packets comprising broadcast and/or multicast and/or reserved destination IP addresses and decide how to handle them;
   before h) based on the identification of packets performed at the second processor, selectively permitting data contained in the received data packets to be forwarded to an output.

2. A method of filtering packets according to claim 1 further comprising the step of:
   Verifying a packet against one or more pre-determined standards and deciding how to handle data contained in said packet.

3. A method of filtering packets according to claim 1 further comprising the step of:
   Constructing a new frame header for use in creating a packet comprising data contained in said received data packets.

4. A data filter comprising:
   a first processor;
   a second processor; and
   at least one unidirectional pathway located between the first processor and the second processor;
   wherein the first processor is configured:
      a) receive data packets from an input;
      b) separate one or more elements of a header of each packet into metadata associated with the packet;
      c) forward the metadata along the unidirectional pathway to the second processor;
   wherein the second processor is configured to use the metadata to:
      d) identify packets comprising any format other than one or more specified EtherTypes and decide how to handle them;
      e) identify packets comprising Etherframe broadcast data and decide how to handle them;
      f) identify packets comprising VLAN tagging information and decide how to handle them;
      g) identify packets comprising broadcast and/or multicast and/or reserved destination IP addresses and decide how to handle them; and
   wherein the first processor is further configured to:
      h) based on the identification of packets performed at the second processor, selectively permit data contained in the received data packets to be forwarded to an output.

5. A data filter according to claim 4, wherein the second processor is configured to verify a packet against one or more pre-determined standards and decide how to handle data contained in said packet.

6. A data filter according to claim 4, wherein the unidirectional pathway is provided by electronic hardware.

7. A data filter according to claim 6, wherein the electronic hardware comprises one or more SerDes pins.

8. A data filter according to claim 6 comprising at least one unidirectional amplifier.

9. A data filter according to claim 8, wherein the at least one unidirectional amplifier comprises a unity gain amplifier having high reverse isolation characteristics.

10. A data filter according to claim 4, further comprising at least one transceiver for a network connection.

11. A data filter according to claim 10, wherein the transceiver comprises at least one receiver and at least one transmitter.

12. A data filter according to claim 10, wherein the transceiver comprises an Ethernet interface.

13. A data filter according to claim 4 wherein the first and/or second processor comprises at least one of an FPGA, an ASIC or an integrated circuit.

14. A data filter according to claim 4, comprising at least one further processor comprising at least one of FPGA's, ASICs or integrated circuits.

15. A data filter according to claim 14 wherein the further processor is implemented as a distinct region on a single PCB.

16. A data filter according to claim 4, wherein the first processor manages network services.

17. A data filter according to claim 4, wherein the second processor manages secure services.

18. A data filter according to claim 4 wherein the first and/or second processor is implemented as a distinct region on a single PCB.

19. A data filter according to claim 4 wherein said first and/or second processor is adapted to encrypt and/or decrypt bitstreams passing therethrough.

20. A data filter according to claim 4 comprising indicating means to indicate the status of the data filter.

21. A data filter according to claim 4 wherein the data filter further comprises at least one power supply unit.

22. A data filter according to claim 21 wherein the power supply unit is powered by Power over Ethernet.

23. A data filter according to claim 22 wherein Power over Ethernet input is sourced from a trusted network port.

24. A data filter according to claim 21, wherein the first processor has a first power supply unit and the second processor has a second power supply unit, wherein the first power supply unit and the second power supply unit are separate and distinct from each other.

\* \* \* \* \*

UNITED STATES PATENT AND TRADEMARK OFFICE
CERTIFICATE OF CORRECTION

| | |
|---|---|
| PATENT NO. | : 11,184,256 B2 |
| APPLICATION NO. | : 16/349352 |
| DATED | : November 23, 2021 |
| INVENTOR(S) | : Robert John Dale and John Alan Thorp |

It is certified that error appears in the above-identified patent and that said Letters Patent is hereby corrected as shown below:

In the Claims

Column 16, Line 22, replace "wherein the first processor is configured:" with -- wherein the first processor is configured to: --.

Signed and Sealed this
Eighteenth Day of April, 2023

Katherine Kelly Vidal
*Director of the United States Patent and Trademark Office*